United States Patent [19]
Jefferson et al.

[11] Patent Number: 5,326,026
[45] Date of Patent: * Jul. 5, 1994

[54] ENERGY AND PEAK-LOAD CONSERVING THERMOSTAT AND METHOD WITH CONTROLLED DEADBAND

[75] Inventors: Donald E. Jefferson, Silver Spring, Md.; Arnold D. Berkeley, 9748 Avenel Farm Dr., Potomac, Md. 20854

[73] Assignee: Arnold D. Berkeley, Potomac, Md.

[*] Notice: The portion of the term of this patent subsequent to Sep. 14, 2010 has been disclaimed.

[21] Appl. No.: 97,056

[22] Filed: Jul. 27, 1993

Related U.S. Application Data

[63] Continuation-in-part of Ser. No. 880,556, May 8, 1992, Pat. No. 5,244,146.

[51] Int. Cl.$^5$ .............................................. F23N 1/00
[52] U.S. Cl. ..................... 236/11; 236/46 E; 236/46 F; 165/12
[58] Field of Search ............... 236/11, 46 R, 46 F, 236/10, 78 D, 46 E; 62/158, 231; 165/12

[56] References Cited

U.S. PATENT DOCUMENTS

| | | | |
|---|---|---|---|
| 4,090,663 | 5/1978 | Bonne et al. | 236/10 |
| 4,094,166 | 6/1978 | Jerles | 62/158 |
| 4,136,730 | 1/1979 | Kinsey | 62/231 X |
| 4,199,023 | 4/1980 | Phillips | 165/12 |
| 4,725,001 | 2/1988 | Carney et al. | 236/11 |
| 4,938,684 | 7/1990 | Karl et al. | 431/1 |
| 5,244,146 | 9/1993 | Jefferson et al. | 236/11 |

Primary Examiner—Harry B. Tanner
Attorney, Agent, or Firm—Richard H. Stern

[57] ABSTRACT

A thermostat is disclosed for controlling a heating system, particularly a forced hot-air furnace, so as to improve fuel efficiency and decrease peak fuel load. The thermostat controls the length of fuel-on cycles, so that the heat exchanger of the furnace is not saturated. A wide deadband (approximately 3° F.) for the thermostat further aids in lessening fuel usage. Forced air operation continues for a secondary-delivery period immediately after the thermostat turns the furnace off, thereby extracting additional heat from the heat exchanger and ductwork, but the length of the secondary-delivery period is limited so that the heat exchanger does not cool off beyond a predetermined amount.

20 Claims, 6 Drawing Sheets

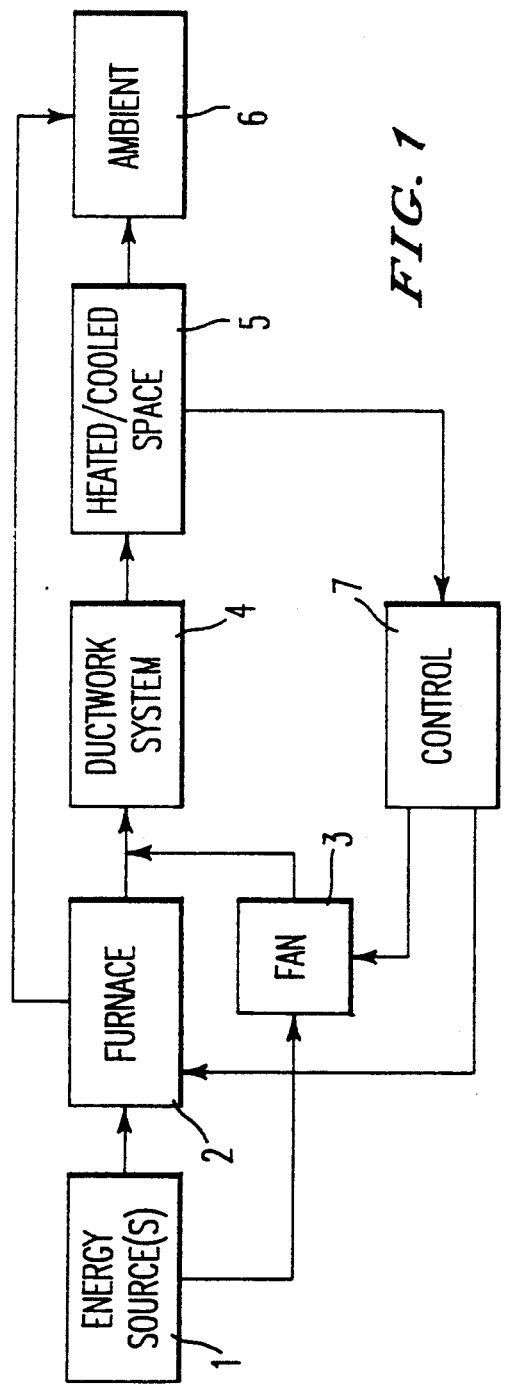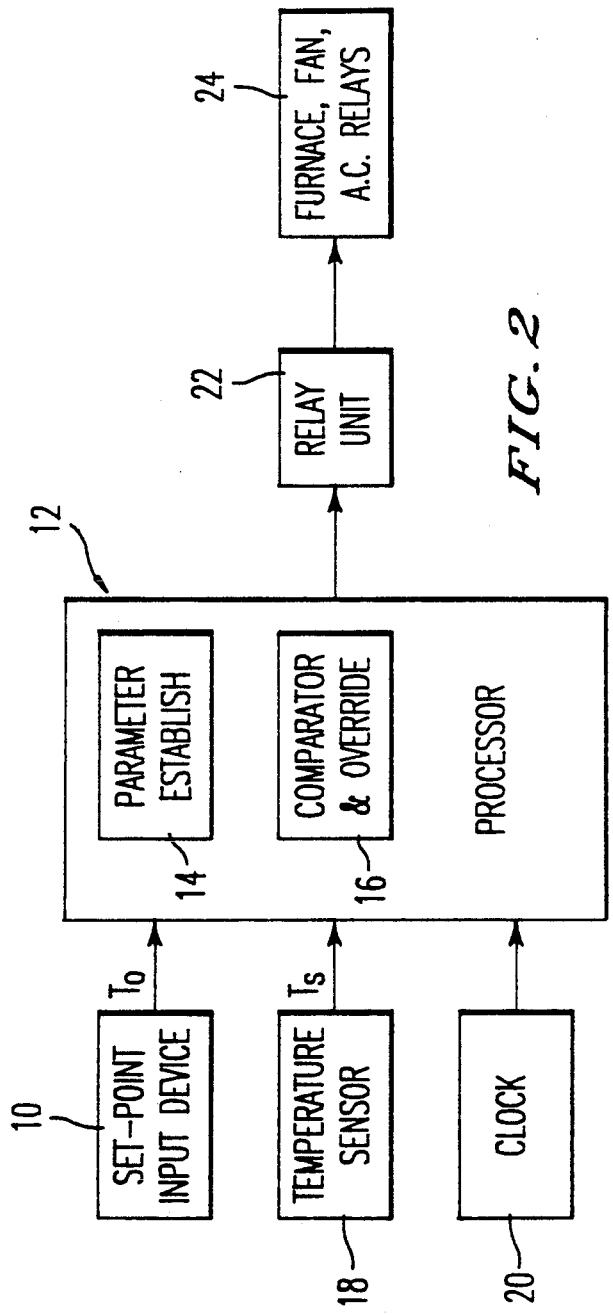

ENERGY AND PEAK-LOAD CONSERVING THERMOSTAT AND METHOD WITH CONTROLLED DEADBAND

This is a continuation-in-part of Ser. No. 07/880,556, filed May 8, 1992, (U.S. Pat. No. 5,244,146, allowed but not issued at the time this specification was filed) and the inventors claim priority based thereon.

BACKGROUND OF THE INVENTION

This invention concerns a thermostat for controlling heating, ventilation, and air conditioning (HVAC) systems in a manner that conserves expenditure of energy and lessens utility peak-load. The invention also concerns a method for operating HVAC systems under the control of such a thermostat to conserve energy and lessen utility peak-load. The invention is directed particularly to such operation of furnaces of such HVAC systems.

The use of short heating cycles to conserve energy in furnaces is taught by, among others, Phillips et al. U.S. Pat. No. 4,199,023. Carney et al. U.S. Pat. No. 4,725,001 generally reviews the prior art in this field including on/off cycling techniques previously taught.

While the Carney et al. thermostat may provide savings in energy usage, the present inventors believe that its technique has limitations that prevent achievement of energy savings beyond a certain point. More specifically, its technique of manipulation of on-time and off-time intervals until the system runs into the edge of the deadband of the set-point is only indirectly related to the HVAC system parameters and the model characterizing the system. That in turn limits the optimization possible, particularly when system parameters (such as ambient temperature) change. Hence, the Carney et al. thermostat can cause the HVAC system to operate under conditions of heat-exchanger saturation or non-linearity, which leads to fuel waste. In addition, the cycling system using incrementation or decrementation of on-time and off-time intervals requires a many-cycle period to catch up with changes in temperature on load.

While Carney et al. and Phillips et al. recognize the desirability of short on-time intervals, they (as well as others using increment/decrement cycling methods) fail to provide thermostat systems that consistently avoid partial saturation of the HVAC system's heat exchanger. Rather, their and other prior art thermostats utilize "continuous burn" cycles (also referred to as 100% duty cycles) to reach set-point temperature, when that is deemed necessary to overcome a temperature excursion. They do so despite the fact that such operation leads to full or partial saturation of the heat exchanger with a consequent adverse effect on fuel consumption efficiency.

Similarly, although Karl et al. U.S. Pat. No. 4,938,684 discloses limitation of fuel-on intervals to a given maximum value, the length of the interval thus taught is not related to the saturation characteristics of the heat exchanger of the HVAC system.

Further, total saturation of a heat exchanger is not the only operating region in which the heat exchanger is inefficient. A heat exchanger may not be fully saturated to the point where no heat exchange at all occurs. Nevertheless, to the extent that the length of the fuel-consuming interval is so long that significant nonlinearity occurs, then inefficient fuel utilization occurs because of relatively poorer heat transfer. It is believed that prior art thermostats fail to teach the importance of consistently remaining in a linear operating region of the HVAC system's heat exchanger and avoiding more than minimal partial saturation of the heat exchanger. This issue is discussed in greater detail in the specification of the parent patent application of which this patent application is a continuation-in-part, said specification being incorporated herein by reference.

It is also believed that the prior art does not address the issue of making heat flux from the furnace to the heated space equal heat flux from the heated space to the ambient. In particular, the prior art does not address determination of system parameters characterizing such flux, so as to regulate it at a desired equilibrium. Rather, prior art devices in this art depend on temperature measured at the thermostat to regulate space temperature, on a feedback basis. Thus, when the difference between measured space temperature at the thermostat and a predetermined setpoint temperature exceeds a predetermined threshold, the heating system is actuated (or deactivated).

It is known to use wide "deadbands" for thermostats of such systems, providing hysteresis to counteract such effects as undue system fluctuation or "hunting," which may at times result from slight drafts caused by a person walking past the thermostat. That feature has been considered inconsistent, however, with maintaining a tight temperature regulation. Accordingly, the system described in the patent of which the instant patent application is a continuation-in-part attempted to minimize the width of the deadband. That system and other prior art systems, however, did not consider what effect, if any, that the width of the deadband might have on peak or daily energy consumption.

OBJECTS AND SUMMARY OF INVENTION

It is an object of the present invention to provide a thermostat for controlling the operation of HVAC systems (including, among other things, forced-air heating and boiler heating) to conserve energy usage. It is intended that this object should be accomplished by making the operation of the HVAC system that the thermostat directs be responsive as directly as possible to the relevant parameters of the system comprising the house (or other "defined space") that is heated, HVAC system, and ambient. The inventors consider the principal relevant parameters of such systems to be the linearity characteristics of the heat exchanger, the heat-flux parameters of the system during on-time (fuel-using) and off-time (non-fuel-using) intervals, and system constraints dictating minimum on-time and off-time intervals. Since some of these parameters are site-specific, it is a further object of the invention to provide a means of determining site-specific factors and incorporating them into the control mechanisms of a thermostat. It is a further object of the invention to utilize such parameters in order to maintain thermal equilibrium of the furnace, heated space, and ambient, considered as a system.

It is a further object of the invention to decrease peak-load fuel consumption of utilities, as well as base-load fuel consumption. The invention decreases peak-load usage of fuel by limiting the duty cycle of each HVAC system using the invention to a predetermined fraction of 100%, thereby causing the thermostat of the invention to interdict any "continuous burn" mode in that HVAC system. The predetermined fraction of 100% is such that the HVAC system preferably operates at all times with a substantially unsaturated heat exchanger. This simultaneously (1) increases the efficiency of fuel utilization in all HVAC systems equipped with the thermostat of the invention and (2) prevents the peak-load fuel consumption, caused by a set of randomly distributed HVAC systems using the thermostat, from ever exceeding a predetermined fraction of the sum of their maximum capacity ratings, since none of the set is permitted to operate on a 100% duty cycle.

Various expedients and implementations to control the relation of furnace on-time and furnace off-time to one another, in order to lessen energy consumption, are described in the specification of the patent of which this is a continuation-in-part, which specification is incorporated herein by reference.

An additional aspect of the invention is to lessen peak load in certain circumstances by appropriate control of the deadband of the temperature sensor used in the thermostat. (The determination of gas peak load is generally made on a basis of maximum daily output as affected by hourly limitations. The determination of electrical peak load is generally made by measuring the kilowatt-hours generated during a given hour or half-hour period. It is therefore desirable to prevent any single heat-modifying apparatus from being in a fuel-on state during the given period.) This is accomplished by setting a deadband at approximately 3° F.

A further aspect of the invention is to decrease overall fuel consumption by controlling the length of a furnace's secondary-delivery interval so that the furnace plenum does not cool off so much that it takes a long time for it to be reheated to the point that it provides useful heat transfer to air passing through it. This is advantageously accomplished by determining the length of the secondary-delivery interval by measuring room temperature, rather than plenum or duct temperature. Optimal results occur when the secondary-delivery interval continues for a period until room temperature begins to decrease from its maximum value.

BRIEF DESCRIPTION OF DRAWINGS

FIG. 1 is a block diagram of the entire system comprising building, HVAC unit, ductwork or pipe system, ambient, and control.

FIG. 2 is a block diagram of the elements of a thermostat.

FIG. 4A shows a sample routine used in both the MAX_ON test shown in FIG. 4B and the SEC_DELY test shown in FIG. 4C.

DETAILED DESCRIPTION OF INVENTION

Terminology

Figure 3:
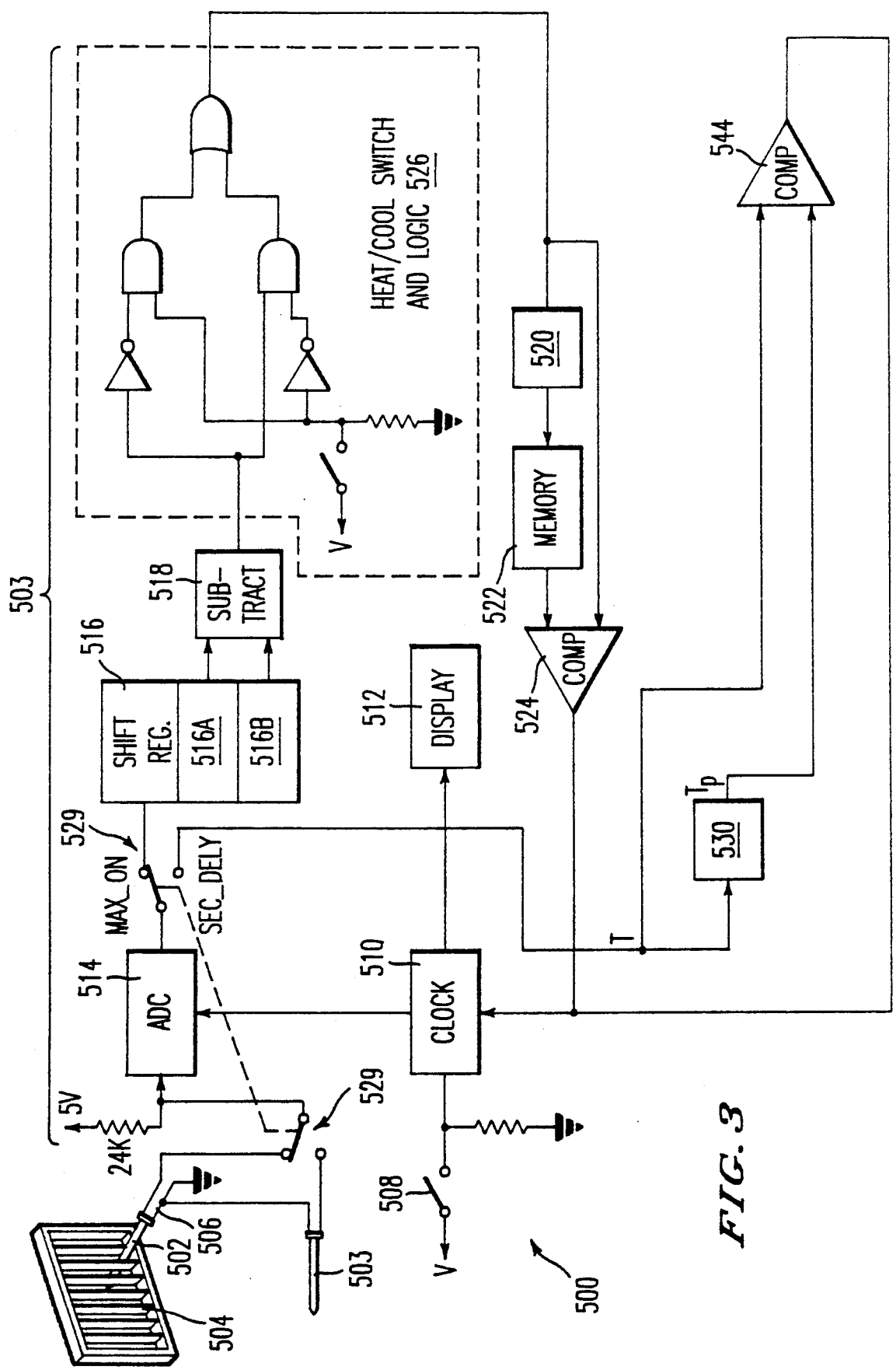
FIG. 3 is an alternative system for determining MAX_ON and SEC_DELY.

In this specification, as in the parent application, the term "fuel-on interval" means a time period during which fuel is delivered to, and is consumed by, a furnace, i.e., a fuel-on state of the system. The thermostat electrical control signal associated with, and which the system uses to initiate, such a fuel-on state is at times designated or referred to as FUEL=1.

The term "fuel-off interval" means a time period during which fuel is not delivered to, and is not consumed by, a furnace, i.e., a fuel-off state of the system. The thermostat electrical control signal associated with, and which the system uses to initiate, such a fuel-off state is at times designated or referred to as FUEL=0.

The term "maximum-on interval" refers to a predetermined maximum for a fuel-on interval. As described in greater detail in the parent specification, this is an interval during which a heat exchanger operates in its substantially linear region, so that equal increments of fuel consumption result in substantially equal increments of temperature rise for the furnace's heat exchanger.

The term "delivery interval" means a time period during which a fan or pump of a HVAC is on and causes heat to be delivered from the heat exchanger of the HVAC to the heated space of the house or other building that the HVAC services, i.e., a delivery-on state of the system. The thermostat electrical control signal associated with, and which the system uses to initiate, such a delivery-on state is at times designated or referred to as DELY=1. Similarly, DELY=0 designates a thermostat electrical control signal associated with, and which the system uses to initiate, a delivery-off state, a time period during which a HVAC fan or pump is off and there does not cause heat to be delivered from the heat exchanger to the heated space of the house or other building that the HVAC services.

The term "primary-delivery interval" refers to an interval after a furnace has been turned on, during which a fan or pump is also on and extracts heat from the furnace's heat exchanger. During a primary-delivery interval, FUEL=1 and DELY=1.

The term "secondary-delivery interval" refers to an interval after a furnace has been turned off, during which a fan or pump remains on to extract heat stored in the furnace's heat exchanger during the preceding fuel-on interval. During a secondary-delivery interval, FUEL=0 and DELY=1. Nevertheless, the HVAC delivers heat to the heated space of the house or other building that it services, because the air passing through the heat exchanger picks up heat.

The term "set point" refers to a predetermined temperature at which a HVAC is set to operate, plus or minus a predetermined number of degrees. For example, a house may have a set point of 70° F.±2° F. At 72° F. the furnace will turn off; at 68° F. the furnace will turn on. The 4° F. interval between 72° F. and 68° F. is referred to as the "deadband" of the thermostat of the HVAC.

The term "pause" or "pause time" is used hereinafter to refer to a period of time during which both FUEL=0 and DELY=0, but nonetheless the heated space of the house or building that the HVAC services remains within a predetermined number of degrees of the desired (set-point) temperature. As discussed in detail in the specification of the parent patent application of which this is a continuation-in-part, this interval of time (in minutes) is approximately equal to the deadband (in °F.) divided by a leakage heat flux parameter (in °F./min). For example, if a given house loses heat to the external environment (ambient) at a rate of 0.2° F./min, and the set point and deadband are as described in the preceding paragraph, the pause time will be approximately 20 minutes (i.e., 4.0/0.2).

During a heating cycle beginning with the time that the furnace of the system is turned on, there may be the following three successive components:
(1) FUEL=1, DELY=1—fuel-on interval (also, primary delivery interval)
(2) FUEL=O, DELY=1—secondary delivery interval
(3) FUEL=O, DELY=1—pause time.
The system then returns to (1).

Introduction

As explained in the specification of the parent patent, the thermostat of the invention operates the HVAC system in a manner that keeps energy credits balanced with energy debits. That result is advantageously accomplished by measuring certain thermal parameters and using them to determine the relation of furnace off-time to on-time. Such parameters change with environmental conditions, and the system drifts from setpoint; expedients must therefore be adopted to counteract such drift, which are described in the parent specification, incorporated herein by reference.

Determination of Maximum Fuel-On Interval

A preferred method for operating the HVAC system for heating comprises the following steps: First, the furnace operates for a predetermined interval (a "maximum fuel-on interval," at times referred to as MAX_ON), during which the furnace consumes fuel and the delivery system delivers heat to the heated space. At the end of this interval, the heat exchanger has become region. Ther it passes beyond its linear region. Thereafter, equal additional increments of fuel consumption provide successively smaller increments of heat exchanger temperature increase.

An appropriate value of MAX_ON is determined by measuring the duration of the linear zone of operation of the HVAC. As described in greater detail in the parent specification, a temperature probe is inserted into a hot-air register. Successive temperature readings are taken to determine when temperature no longer rises linearly. The MAX_ON determination is then fed to the thermostat system for use as a system control parameter.

Then, the furnace stops consuming fuel; a fuel-off interval begins and continues until the next fuel-on interval occurs.

Secondary-Delivery Interval

At the beginning of the fuel-on interval, or very shortly thereafter (within 1 min), a fan (or other delivery device) is actuated and a delivery interval begins. The delivery interval has two successive components. The first component, which occurs during the fuel-on interval, is a primary-delivery interval. The second component, which occurs for a predetermined interval following the end of the fuel-on interval and during the delivery-on interval, is a secondary-delivery interval (at times designated "SEC_DELY").

The parent specification describes how to determine an appropriate value of SEC_DELY by measuring the duration of the period, after the furnace turns off, during which the temperature of the air that HVAC system delivers at a duct to the heated space remains within approximately 20 percent of its range above starting temperature. During this period the HVAC system usually continues to deliver useful heat to the heated space. As described in greater detail in the parent specification, a temperature probe is inserted into a hot-air register. Successive temperature readings are taken to determine when temperature falls within a predetermined difference from room temperature. The SEC_DELY determination thus made is then fed to the thermostat system for use as a system control parameter.

Site-Specific Parameters

An important aspect of the present disclosure is a different way for determining SEC_DELY. The appropriate maximum fuel-on interval is a function primarily of the mass of the plenum and nearby ductwork (or in the case of a boiler system, the thermal mass of the fluid), and of the rate of combustion in the furnace. That interval is thus site-specific, although similar installations of the same model of furnace will have similar values of this parameter. Similarly, the proper secondary-delivery interval is site-specific, depending on such factors as the mass of the ductwork and plenum, and fan throughput. In the case of boiler systems, secondary-delivery is particularly important because of the great thermal mass of the water in the system.

An illustrative example in the parent specification may be considered to suggest that the SEC_DELY value should be sufficient to extract 90% of the residual heat in the furnace plenum. It states: "For example, a maximum value of plenum temperature at the end of a maximum fuel-on interval may be 130° F., which may be 60° F. above a minimum measured plenum temperature of 70° F. Here 90% of the difference temperature is 54° F., so that in this example 90% of the heat is extracted when the plenum temperature has fallen to 76° F." Further work by the inventors since the time the parent specification was filed indicates that it is advantageous not to extract so much heat from the plenum that it falls to as low a temperature as within 10% of equilibrium. Doing that requires a longer period to heat the plenum up again (at the beginning of the next fuel-on interval) so that it transmits substantial heat to air passing through it. That appears to result in less economical operation than does beginning the next fuel-on interval with a higher-temperature plenum. This point is described in greater detail below.

FIG. 3 of this specification illustrates an alternative to what is shown in FIG. 15 of the parent specification. To facilitate comparison, the numbering of FIG. 15 of the parent specification is carried forward to FIG. 3 of the present specification.

A sensor 503 is added to the system depicted in FIG. 15, located adjacent to original sensor 502 in the diagram. Additionally, single pole switch 528 of FIG. 15 is now replaced by a double pole, double throw switch 529, inserted into the input for ADC 514. Switch 529 is connected so that sensor 502 is used to feed ADC 514 for MAX_ON determinations and sensor 503 is used to feed ADC 514 for SEC_DELY determinations. Thus, no change is made in the method for determining MAX_ON.

Measurement of Secondary-Delivery Interval

Sensor 503 is placed near the existing thermostat of the HVAC system. The house is brought to approximately desired set-point temperature (for example, 70° F.) using the existing thermostat. Switch 529 is switched from MAX_ON position to SEC_DELY position. The HVAC system is placed in a continuous operation mode for its blower (fan), using the HVAC system's existing manual fan switch. The start/reset button is actuated as soon as the furnace turns off.

A clock count and LCD display 512 starts running. Sensor 503 continuously monitors room temperature $T_s$ every 6 sec. ADC 514 provides a first signal representative of the room temperature $T_{s1}$ when the FUEL=1 ends. The first signal is stored in a memory location 530. After another 6 sec ADC 514 provides a second signal representative of then current room temperature $T_{s2}$. If $T_{s2} > T_{s1}$, $T_{s2}$ replaces $T_{s1}$ in memory location 530 and the process repeats. If $T_{s2} \leq T_{s1}$, comparator 544 stops clock (i.e., timer) 510 and display 512 shows the time elapsed since the FUEL=1 signal ended. This period is SEC_DELY and represents the length of time that the heated space can be caused to increase its temperature while FUEL=0, i.e., after the beginning of a fuel-off state. The value of SEC_DELY determined in the foregoing manner is used to practice the invention in the same way that the SEC_DELY value is utilized in the parent specification.

Figure 4:
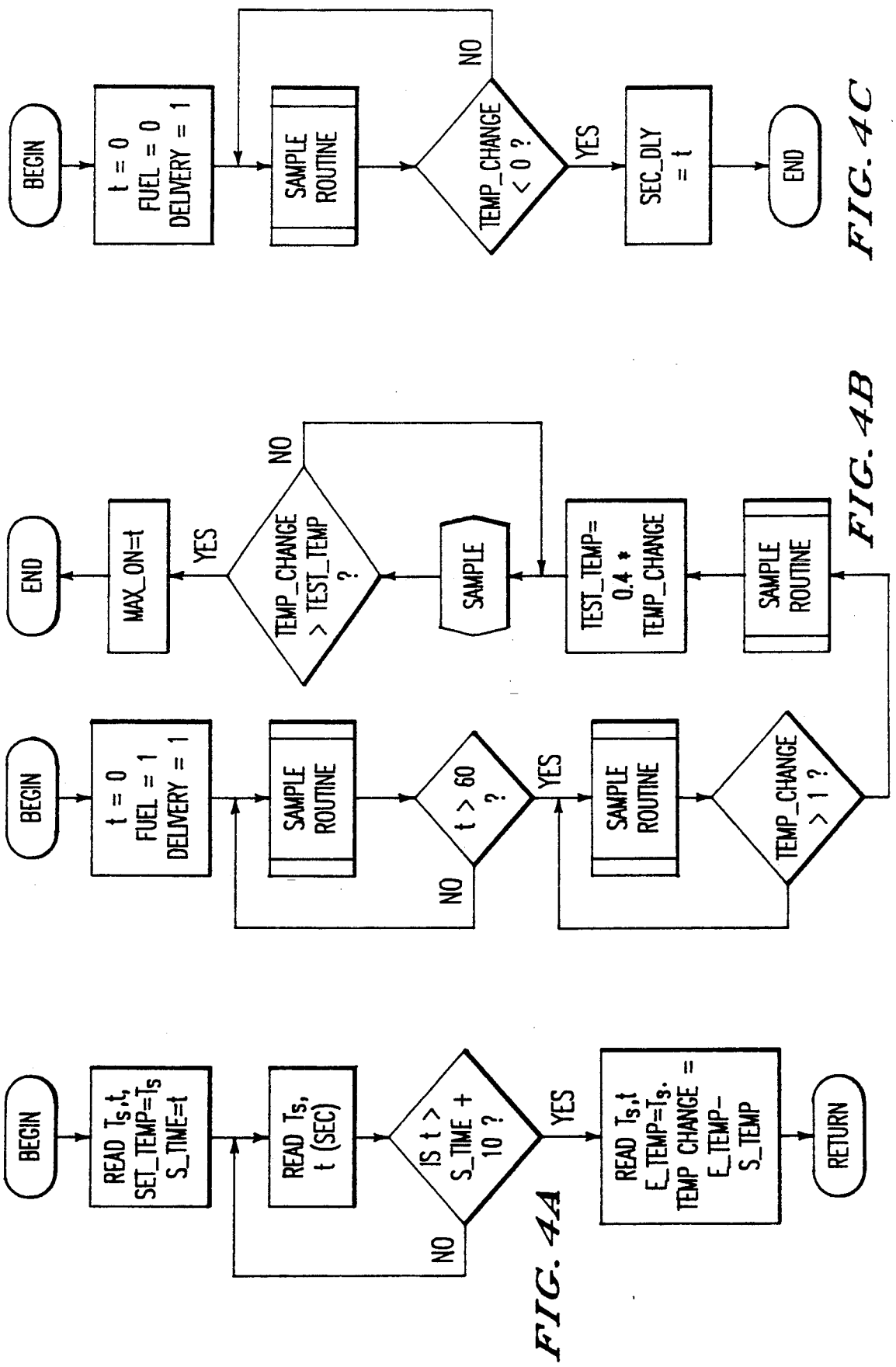
FIGS. 4A, 4B, and 4C show flowcharts for a programmed microcontroller or programmed microprocessor implementation of the method for determining MAX_ON and SEC_DELY.

As with the parent specification, the foregoing procedure can advantageously be implemented with a programmed microprocessor or microcontroller. FIG. 4 shows a flowchart for this modified implementation.

Other Apparatus Constraints

Minimum on-time requirements may be set by apparatus constraints of some furnace systems. These constraints may include predetermined time delays before intermittently operated fans begin to remove heated air from furnace plenums, which are typical of some furnace systems. (For example, the plenum may have to reach 85° F. before the fan starts, so that cold air will not be circulated to the heated space. This may take 0.5 to 0.8 minutes.) In addition, some gas furnaces operate in two stages, so that full heat generation does not occur until an initial heating stage is completed. Many systems do not have these constraints, and they are usually unimportant (for purposes of this invention) even in those systems having them. More specifically, a fuel-on interval determined by heat-exchanger linearity considerations is frequently On the order of 3-5 minutes for a home HVAC system. That interval is frequently much longer than the duration required by any minimum on-time constraint of a furnace.

Pause Time

Pause time is a period after the secondary-delivery interval ends, but before the next fuel-on interval begins. During pause, FUEL=0 and DELY=0.

In the system described in the parent specification, temperature excursions around set point were contemplated as being approximately 0.5° F., using a semiconductor temperature sensor and providing a narrow deadband. Bimetallic thermostats may have much larger deadbands, on the order of 3° F., approximately six times greater. Consequently, a "narrow deadband" system using the semiconductor sensor may have a much shorter pause time than a "wide deadband" system using a bimetallic thermostat, as shown below.

Making the same assumptions as made earlier, for purposes of illustration, we may consider a home heating system with a heat leakage constant of 0.25° F./min. The fuel-on interval is assumed to be 4 minutes. The secondary-delivery interval is assumed to be 2 minutes. Under these conditions, the narrow deadband system has a pause time of approximately 2.5 minutes, while the wide deadband system has a pause time of approximately 12 minutes.

A single fuel-on interval may be insufficient to bring room temperature $T_s$ up to the desired temperature (the upper limit of the deadband). In such a case a second fuel-on interval may be initiated at the end of the secondary-delivery interval. Whether such repetitions are needed, and their number, depends on the heat delivery capacity of the HVAC system. For the discussion that follows, it is assumed that as many as three fuel-on intervals may be needed to change the heated space over the predetermined deadband.

The respective total heating cycles for the foregoing examples are shown below:

|  | NARROW DEADBAND | WIDE DEADBAND |
| --- | --- | --- |
| Fuel-on interval | 4 min | 4 min |
| Secondary-deliv. interv. | 2 | 2 |
| Pause | 2.5 | 12 |
| Total | 8.5 | 30 |
| On/Off ratio | 47% | 40% |

It will be appreciated that, if both systems provide equivalent subjective comfort levels for home occupants, the wide deadband system will be considerably more economical. Under the foregoing hypothetical conditions, the wide deadband system would consume only 40/47, or 85%, as much fuel as the narrow deadband system.

While the matter is not quite that simple, the inventors have discovered that with certain system efficiencies, surprising and unexpected fuel-consumption economies are realized by increasing the deadband from 0.5° F. to an amount from approximately 2° F. to 3° F., ±1° F. At substantially greater deadbands, however, discomfort to home occupants occurs. While discomfort is a subjective factor, and varies from person to person, the inventors find that it is reasonable to generalize that an improvement in economy, which is not paid for in discomfort, can be realized by increasing the deadband of the thermostat of the parent specification from a value of 0.5° F. to an amount ranging from approximately 2° F. to 3° F.

The inventors consider 3° F. optimum as a deadband for this purpose. The wider the deadband, the better, for fuel economy; but home occupants appear to begin complaining about discomfort when the deadband is increased beyond 3° F. Thus, if one wanted a set-point of 70.5°±1.5° F., one could set the upper limit of the deadband at 72° and the lower limit at 69°. That would provide a 3° deadband, which the manufacturer or supplier of the thermostat would establish.

The inventors believe that it is preferable for users to set set-points as integers rather than as fractional degree settings (such as 70.5°). While the semiconductor sensor described in the parent specification could easily provide readings in fractions of a degree, such as 0.5 °, for programming purposes it is easier to use integer arithmetic than floating-point arithmetic; also, users are not accustomed to setting thermostats in fractions of a degree. Therefore, the inventors consider it preferable to accomplish the same result by having a set-point of 70° F.,+2° or −1°. This provides the same 69° to 72° range—the same deadband—but only integers are used.

Secondary Delivery

As indicated above, more recent work of the inventors suggests that it is more economical not to approach the plenum's ambient temperature too closely during the secondary-delivery interval. Rather, in order to achieve a more economical mode of operation, it is preferable to shorten the value of SEC_DELY so that the plenum does not cool off so much that it takes a substantial time before it heats up enough again on the next cycle to be able to deliver appreciable heat to air blown through it.

To accomplish this purpose, the inventors consider it optimal to allow the secondary-delivery interval to continue until the room temperature stops increasing as a result of secondary-delivery and starts to decrease. This can be accomplished in any of several ways. Thus, the appropriate secondary-delivery interval can be re-determined during every heating cycle; however, that can lead to erratic cycles if a draft causes a deceptive reading to occur at the temperature sensor. To prevent that, the secondary-delivery interval can be redetermined in the foregoing manner, but a continuous moving time average can be taken. The inventors consider this feasible but unnecessary. They have found that the secondary-delivery interval does not vary much with different temperature conditions. Hence, it is practicable just to measure it periodically, average the result, and use the value so determined until the next time such a measurement is made.

Thus, in a calibration mode, such periodic room temperature measurements are made at the temperature sensor by sampling room temperature $T_i$ every 20 seconds after the furnace turns off on a FUEL=0 signal. When a value $T_{i+1}$ is sampled next after a value $T_i$ is sampled, and $T_{i+1} < T_i$, that determines the end of the secondary-delivery interval.

Figure 5:
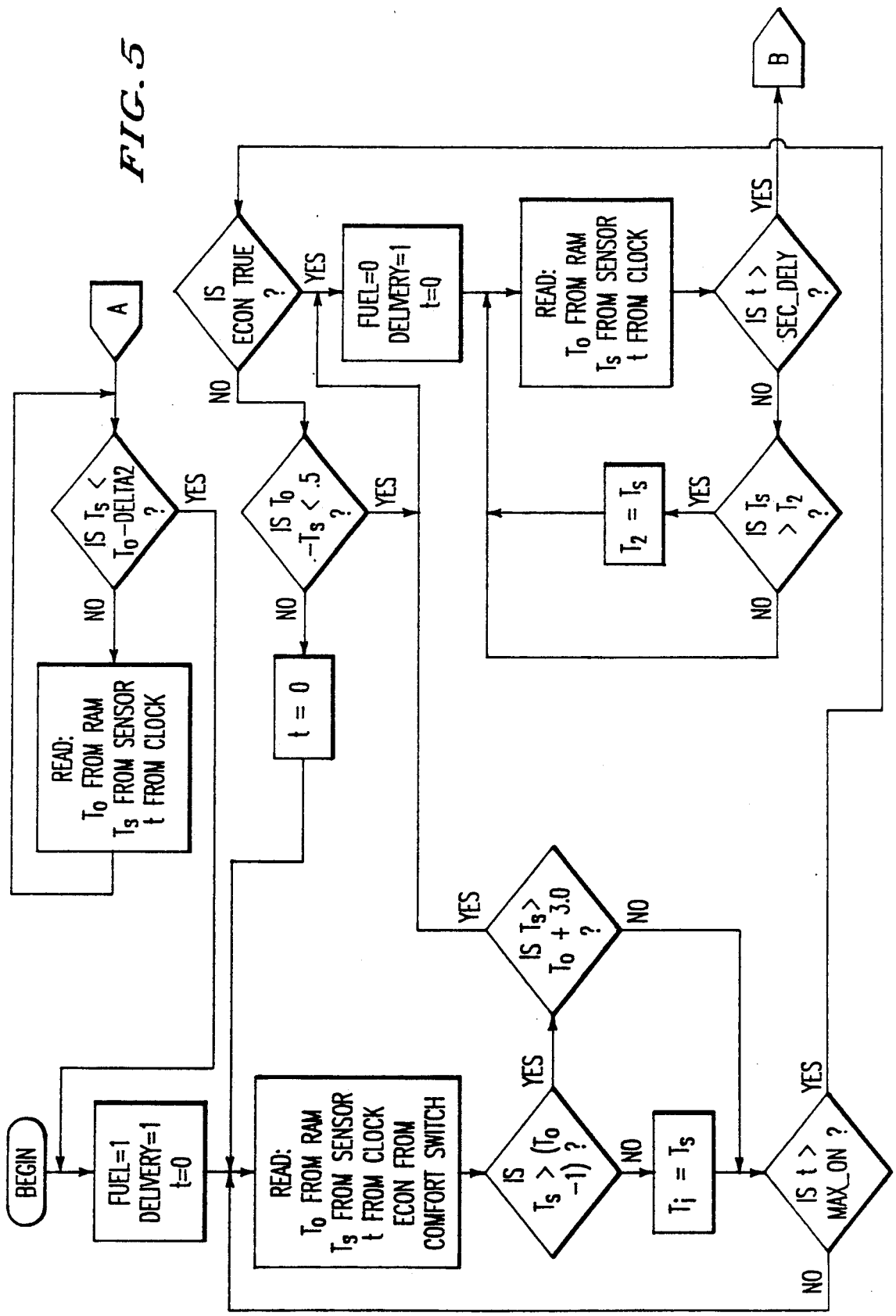
FIGS. 5, 6, and 7 show flowcharts for two programmed microcontroller or microprocessor implementations of the thermostat in a wide deadband mode of operation.
Figure 6:
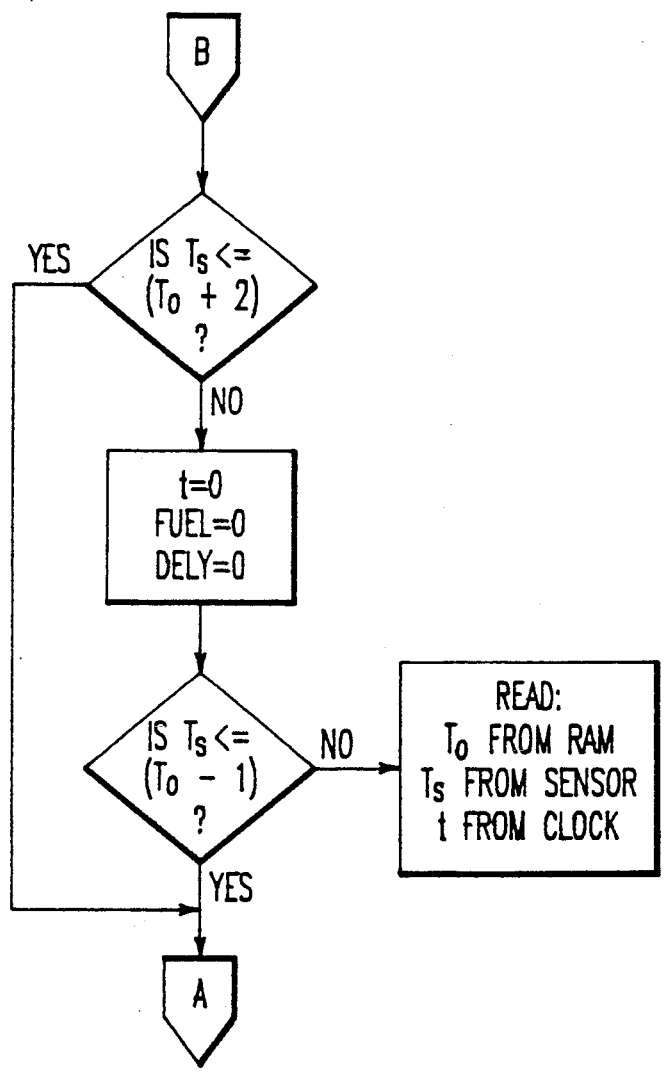
Figure 7:
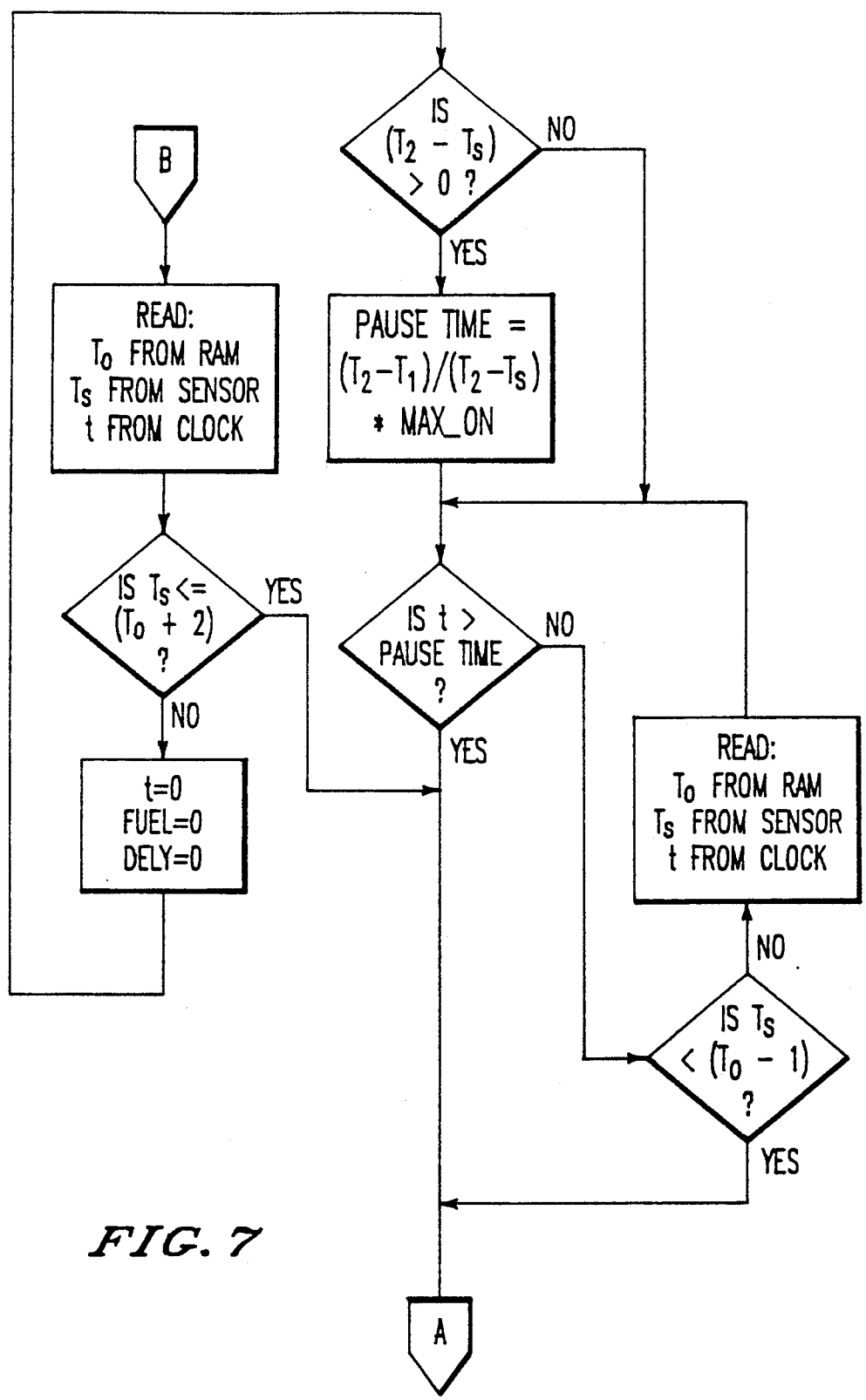

The parent specification showed at least three methods for determining the appropriate pause time to complement that MAX_ON time in order to conserve the energy input and leakage balance. The computed pause method appears most sensitive to deadband width. The increment/decrement method allows some fluctuation in deadband depending on the size of the minimum-off interval selected and the value of N when the set point is reached. FIG. 5 herein shows a modification to FIG. 14 of the parent specification. The modification implements the larger deadband described herein for the delivery-off portion of the flowchart. FIG. 6 shows a modified version of FIG. 14A of the parent specification, to implement the decision as to whether to change the fuel-on interval or whether a pause interval can be initiated. FIG. 7 shows a similarly modified version of FIG. 14B of the parent specification. In these FIGS. 5-7 a deadband of +2° and -1° is used, but the implementation applies to any deadband selected.

The following tabulation shows a theoretical comparison of the percent time during a 24-hour day that the narrow deadband and wide deadband thermostats would keep a furnace on, under variable airflow and constant conditions for other site-specific factors. As appears below, when delivery capacity is low, the difference between thermostats is negligible. Under higher delivery capacity, use of wider deadband causes a noticeable decrease in fuel consumption.

| AIRFLOW (cfm) | NARROW DEADBAND ON-TIME | WIDE DEADBAND ON-TIME | FUEL SAVED ON RATIO BASIS |
| --- | --- | --- | --- |
| 170 | 44.8% | 43.5% | 2.8% |
| 210 | 37.9 | 36.8 | 2.9 |
| 250 | 36.1 | 32.1 | 11.3 |
| 290 | 35.6 | 28.3 | 20.4 |

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this inventdescription ofited to the detailed description of the invention hereinabove, but rather comprehends the subject matter defined by the following claims.

The subject matter claimed is:

1. A fuel-conserving thermostat for controlling operation of a heating system that consumes fuel during a fuel-on interval and heats a defined space, thereby increasing a space temperature of said space; said space being thermally conductive to an ambient, whereby a heat flux occurs from said space to said ambient; said heating system comprising:

heating means for providing heat during said fuel-on interval;

delivery means for delivering heat to said space during a delivery interval, whereby a heat flux occurs from said heating means to said space during said delivery interval;

a heat exchanger;

signal-receiving means, coupling said thermostat and said heating means, for:
 initiating one of said fuel-on intervals, which begins when said signal-receiving means receives a FUEL=1 signal from said thermostat;
 terminating said fuel-on interval and initiating a fuel-off interval in which said furnace does not consume fuel, said fuel-off interval beginning when said signal-receiving means receives a FUEL=0 signal from said thermostat;
 initiating one of said delivery intervals, which begins when said signal-receiving means receives a DELY=1 signal from said thermostat; and
 terminating said delivery interval and initiating a nondelivery interval in which said furnace does not deliver heat to said space, said nondelivery interval beginning when said signal-receiving means receives a DELY=0 signal from said thermostat;

said thermostat including:
 a timer providing timing signals;
 a temperature sensor having means for providing a space-temperature signal representative of said space temperature;
 means for providing a set-point-temperature signal representative of a set-point temperature; and
 means for providing said FUEL=0, FUEL=1, DELY=0, and DELY=1 signals;

said thermostat further comprising: means for providing a maximum-on signal representative of a maximum fuel-on interval, where said maximum-on signal is provided by signal generating means for providing a signal representative of how long said heat exchanger can operate during a fuel-on interval in a linear mode before its mode of operation becomes nonlinear; and burn-control means for causing a fuel-on interval to have a duration of no longer than said maximum fuel-on interval; and said temperature sensor having coupled thereto means for predetermining a deadband of from 1 to 4 degrees Fahrenheit for said temperature sensor.

2. A thermostat according to claim 1, wherein said deadband for temperature sensor is 3 degrees Fahrenheit.

3. A thermostat according to claim 1, wherein said signal-generating means provides a signal representative of a maximum fuel-on interval which is specific to the particular heating system used to heat the defined space.

4. A thermostat according to claim 3, wherein said signal is provided by probe means for measuring changes over time of a monitored temperature representative of the temperature of the heat exchanger of said heating system.

5. A thermostat in accordance with claim 1:

wherein said delivery means delivers heat for a delivery interval consisting of a primary-delivery interval and a secondary-delivery interval, where:

said primary-delivery interval generally coincides with a fuel-on interval and ends when said fuel-on interval ends, whereupon a fuel-off interval begins;

said secondary-delivery interval begins immediately after said primary-delivery interval ends; and said fuel-off interval continues throughout said secondary-delivery interval;

wherein said thermostat further comprises:

further signal-generating means for providing a signal representative of said secondary-delivery interval; and further burn-control means for causing a fuel-off interval to have a duration of no less than said secondary-delivery interval; and wherein said further signal-generating means is a means for providing a signal representative of how long it takes after a fuel-off interval begins before said heat exchanger falls to a temperature level such that said heat exchanger can operate in a linear mode during a next-following fuel-on interval.

6. A fuel-conserving thermostat for controlling operation of a heating system that consumes fuel during a fuel-on interval and heats a defined space, thereby increasing a space temperature of said space; said space being thermally conductive to an ambient, whereby a heat flux occurs from said space to said ambient; said heating system comprising:

heating means for providing heat during said fuel-on interval;

delivery means for delivering heat to said space during a delivery interval, whereby a heat flux occurs from said heating means to said space during said delivery interval, said delivery interval consisting of a primary-delivery interval and a secondary-delivery interval, where:

said primary-delivery interval generally coincides with a fuel-on interval and ends when said fuel-on interval ends, whereupon a fuel-off interval begins;

said secondary-delivery interval begins immediately after said primary-delivery interval ends; and said fuel-off interval continues throughout said secondary-delivery interval;

a heat exchanger;

signal-receiving means, coupling said thermostat and said heating means, for:

initiating one of said fuel-on intervals, which begins when said signal-receiving means receives a FUEL=1 signal from said thermostat;

terminating said fuel-on interval and initiating a fuel-off interval in which said furnace does not consume fuel, said fuel-off interval beginning when said signal-receiving means receives a FUEL=0 signal from said thermostat;

initiating one of said delivery intervals, which begins when said signal-receiving means receives a DELY=1 signal from said thermostat; and terminating said delivery interval and initiating a nondelivery interval in which said furnace does not deliver heat to said space, said nondelivery interval beginning when said signal-receiving means receives a DELY=0 signal from said thermostat;

said thermostat including:

a timer providing timing signals;

a temperature sensor having means for providing a space-temperature signal representative of said space temperature;

means for providing a set-point-temperature signal representative of a set-point temperature; and means for providing said FUEL=0, FUEL=1, DELY=0, and DELY=1 signals;

said thermostat further comprising:

means for providing a maximum-on signal representative of a maximum fuel-on interval, where said maximum-on signal is provided by signal generating means for providing a signal representative of how long said heat exchanger can operate during a fuel-on interval in a linear mode before its mode of operation becomes nonlinear;

burn-control means for causing a fuel-on interval to have a duration of no longer than said maximum fuel-on interval and for causing a fuel-off interval to have a duration of no less than said secondary-delivery interval; and further signal-generating means for providing a signal representative of said secondary-delivery interval, said further signal-generating means comprising means for providing a signal representative of how long it takes after a fuel-off interval begins before said heat exchanger falls to a temperature level such that said space temperature of said space no longer increases as a result of delivery of air from said heat exchanger.

7. A thermostat in accordance with claim 6, wherein said further signal-generating means provides a signal representative of how long it took after a fuel-off interval began before said space temperature $T_i$ of said space, measured at a time i, is less than said space temperature $T_{i-1}$ of said space, measured at an immediately preceding time i−1, i.e., $T_i < T_{i-1}$.

8. A thermostat in accordance with claim 6, wherein said temperature sensor has coupled thereto means for predetermining a deadband of from 1 to 4 degrees Fahrenheit for said temperature sensor.

9. A thermostat in accordance with claim 6, wherein said temperature sensor has coupled thereto means for predetermining a deadband of 3 degrees Fahrenheit for said temperature sensor.

10. A thermostat in accordance with claim 1, in combination with said furnace system and coupled to said signal-receiving means of said system, said combination comprising a fuel-conserving furnace system.

11. A thermostat in accordance with claim 6, in combination with said furnace system and coupled to said signal-receiving means of said system, said combination comprising a fuel-conserving furnace system.

12. A fuel-conserving thermostat for controlling operation of a heating system that consumes fuel during a fuel-on interval and heats a defined space, thereby increasing a space temperature of said space; said space being thermally conductive to an ambient, whereby a heat flux occurs from said space to said ambient; said heating system comprising:

heating means for providing heat during said fuel-on interval;

delivery means for delivering said heat to said space during a delivery interval, whereby a heat flux occurs from said heating means to said space during said delivery interval;

a heat exchanger;

signal-receiving means, coupling said thermostat and said heating means, for:

initiating one of said fuel-on intervals, which begins when said signal-receiving means receives a FUEL=1 signal from said thermostat;

terminating said fuel-on interval and initiating a fuel-off interval in which said furnace does not consume fuel, said fuel-off interval beginning said signal-receiving means receives a FUEL=0 when said signal-receiving means receives a FUEL=0 signal from said thermostat;

initiating one of said delivery intervals, which begins when said signal-receiving means receives a DELY=1 signal from said thermostat; and terminating said delivery interval and initiating a nondelivery interval in which said furnace does not deliver heat to said space, said nondelivery interval beginning when said signal-receiving means receives a DELY=0 signal from said thermostat;

said thermostat including:

a timer providing timing signals;

a temperature sensor having means for providing a space-temperature signal representative of said space temperature;

means for providing a set-point-temperature signal representative of a set-point-temperature; and means for providing said FUEL=0, FUEL=1, DELY=0, and DELY=1 signals;

said thermostat further comprising:

means for providing a maximum-on signal representative of a maximum fuel-on interval, said maximum-on signal being provided by signal-generating means for providing a signal representative of how long said heat exchanger can operate during a fuel-on interval in a linear mode before its mode of operation becomes nonlinear, said signal-generating means comprising a probe means for measuring changes over time of a temperature representative of the temperature of the heat exchanger of the specific heating system installed at the location of the defined space;

first burn-control means for causing a fuel-on interval having a duration of no longer than said maximum fuel-on interval;

delivery-control means for causing heat to be delivered to said space during a delivery interval comprising said fuel-on interval and continuing after it ends until said heat exchanger falls to a temperature level such that said heat exchanger can operate in a linear mode during a next-following fuel-on interval; and second burn-control means for causing a nondelivery interval to follow said delivery interval for a duration at least as long as said heat exchanger takes to fall to said temperature level; and said temperature sensor having a deadband of from 1 to 4 degrees Fahrenheit.

13. An apparatus in accordance with claim 12, wherein said deadband is 3 degrees Fahrenheit.

14. A fuel-conserving thermostat for controlling operation of a heating system that consumes fuel during a fuel-on interval and heats a defined space, thereby increasing a space temperature of said space; said space being thermally conductive to an ambient, whereby a heat flux occurs from said space to said ambient; said heating system comprising:

heating means for providing heat during said fuel-on interval;

delivery means for delivering said heat to said space during a delivery interval, whereby a heat flux occurs from said heating means to said space during said delivery interval;

a heat exchanger;

signal-receiving means, coupling said thermostat and said heating means, for: initiating one of said fuel-on intervals, which begins when said signal-receiving means receives a FUEL=1 signal from said thermostat;

terminating said fuel-on interval and initiating a fuel-off interval in which said furnace does not consume fuel, said fuel-off interval beginning said signal-receiving means receives a FUEL=0 when said signal-receiving means receives a FUEL=0 signal from said thermostat;

initiating one of said delivery intervals, which begins when said signal-receiving means receives a DELY=1 signal from said thermostat; and terminating said delivery interval and initiating a nondelivery interval in which said furnace does not deliver heat to said space, said nondelivery interval beginning when said signal-receiving means receives a DELY=0 signal from said thermostat;

said thermostat including:

a timer providing timing signals;

a temperature sensor having means for providing a space-temperature signal representative of said space temperature;

means for providing a set-point-temperature signal representative of a set-point-temperature; and means for providing said FUEL=0, FUEL=1, DELY=0, and DELY=1 signals;

said thermostat further comprising:

means for providing a maximum-on signal representative of a maximum fuel-on interval, said maximum-on signal being provided by signal-generating means for providing a signal representative of how long said heat exchanger can operate during a fuel-on interval in a linear mode before its mode of operation becomes nonlinear, said signal-generating means comprising a probe means for measuring changes over time of a temperature representative of the temperature of the heat exchanger of the specific heating system installed at the location of the defined space;

first burn-control means for causing a fuel-on interval having a duration of no longer than said maximum fuel-on interval;

delivery-control means for causing heat to be delivered to said space during a delivery interval comprising said fuel-on interval and continuing after it ends until said heat exchanger falls to a temperature level such that said space temperature of said space no longer increases as a result of delivery of air from said heat exchanger; and second burn-control means for causing a nondelivery interval to follow said delivery interval for a duration at least as long as said heat exchanger takes to fall to said temperature level.

15. A method for conserving energy utilization in a heating system for heating a defined space and thereby increasing a space temperature of said space; said space being thermally conductive to an ambient, whereby a heat flux occurs from said space to said ambient; said heating system consuming fuel, during a fuel-on interval, to provide heat;

delivering said heat, during a delivery interval, to said space;

having a heat exchanger;

having signal-receiving means coupled to a thermostat, for:

initiating one of said fuel-on intervals, which begins when said means receives a FUEL=1 signal from said thermostat;

terminating said fuel-on interval and initiating a fuel-off interval in which said heating system does not consume fuel, said fuel-off interval beginning when said signal-receiving means receives a FUEL=0 signal from said thermostat;

initiating one of said delivery intervals, which begins when said signal-receiving means receives a DELY=1 signal; and terminating said delivery interval and initiating a nondelivery interval, during which said heating system does not deliver heat to said space, said nondelivery interval beginning when said signal-receiving means receives a DELY=0 signal;

said thermostat including a temperature sensor for providing temperature measurements to said thermostat, said temperature sensor having coupled thereto means for predetermining a deadband for said temperature sensor said method comprising:

(1) utilizing said means for predetermining a deadband for said temperature sensor to set said deadband at from 1 to 4 degrees Fahrenheit;

(2) providing said thermostat with a signal maximum-on representative of a maximum fuel-on interval, where said maximum fuel-on interval is how long said heat exchanger can operate during a fuel-on interval in a linear mode before its mode of operation becomes nonlinear;

(3) sending from said thermostat to said signal-receiving means FUEL=1 signals of duration no longer than said maximum fuel-on interval;

(4) when one of said FUEL=1 signals reaches a duration of said maximum fuel-on interval, sending a FUEL=0 signal from said thermostat to said signal-receiving means; and (5) sending from said thermostat to said signal-receiving means DELY=1 signals while said thermostat sends said FUEL=1 signals.

16. A method according to claim 15, wherein said deadband is 3 degrees Fahrenheit.

17. A method according to claim 15 further comprising:

(1) providing said thermostat with a secondary-delivery signal representative of a secondary-delivery interval, where said secondary-delivery interval is how long it takes after a fuel-off interval of a furnace begins before said heat exchanger of said furnace falls to a temperature level such that said space temperature of said space is no longer increased by delivery of air from said heat exchanger;

(2) when one of said FUEL=1 signals ends, sending from said thermostat to said signal-receiving means:

(a) a FUEL=0 signal having a duration at least as long as said secondary-delivery interval; and (b) a DELY=1 signal of duration equal to said secondary-delivery interval; and (3) thereafter sending a DELY=0 signal from said thermostat to said signal-receiving means until a next FUEL=1 signal begins.

18. A method for conserving energy utilization in a heating system for heating a defined space and thereby increasing a space temperature of said space; said space being thermally conductive to an ambient, whereby a heat flux occurs from said space to said ambient; said heating system consuming fuel, during a fuel-on interval, to provide heat;

delivering said heat, during a delivery interval, to said space;

having a heat exchanger;

having signal-receiving means coupled to a thermostat, for:

initiating one of said fuel-on intervals, which begins when said means receives a FUEL=1 signal from said thermostat;

terminating said fuel-on interval and initiating a fuel-off interval in which said heating system does not consume fuel, said fuel-off interval beginning when said signal-receiving means receives a FUEL=0 signal from said thermostat;

initiating one of said delivery intervals, which begins when said signal-receiving means receives a DELY=1 signal; and terminating said delivery interval and initiating a nondelivery interval, during which said heating system does not deliver heat to said space, said nondelivery interval beginning when said signal-receiving means receives a DELY=0 signal;

said thermostat including a temperature sensor for providing temperature measurements to said thermostat said method comprising:

(1) providing said thermostat with a signal maximum-on representative of a maximum fuel-on interval, where said maximum fuel-on interval is how long said heat exchanger can operate during a fuel-on interval in a linear mode before its mode of operation becomes nonlinear;

(2) sending from said thermostat to said signal-receiving means FUEL=1 signals of duration no longer than said maximum fuel-on interval;

(3) when one of said FUEL=1 signals reaches a duration of said maximum fuel-on interval, sending a FUEL=0 signal from said thermostat to said signal-receiving means;

(4) sending from said thermostat to said signal-receiving means DELY=1 signals while said thermostat sends said FUEL=1 signals; and (5) continuing to send from said thermostat to said signal-receiving means DELY=1 signals until said heat exchanger falls to a temperature level such that said space temperature of said space no longer increases as a result of delivery of air from said heat exchanger.

19. A method for decreasing or limiting peak load usage of fuel in a plurality of buildings, said method comprising installing in each of said buildings a thermostat for controlling a heating system of said building, wherein said thermostat:

comprises means for limiting a fuel-on interval of said heating system to no longer than a predetermined maximum fuel-on interval, where said maximum fuel-on interval is how long said heating system's heat exchanger can operate in a linear mode during a fuel-on interval before operating in a nonlinear mode; and has a deadband of 1 to 4 degrees Fahrenheit.

20. A method for decreasing or limiting peak load usage of fuel in a plurality of buildings, said method comprising installing in each of said buildings a thermostat for controlling a heating system of said building, wherein said thermostat comprises:

means for limiting a fuel-on interval of said heating system to no longer than a predetermined maximum fuel-on interval, where said maximum fuel-on interval is how long said heating system's heat exchanger can operate in a linear mode during a fuel-on interval before operating in a nonlinear mode; and means for initiating a fuel-off interval of said heating system, said fuel-off interval continuing for at least a predetermined secondary-delivery interval, where said secondary-delivery interval is how long it takes after said fuel-off interval begins before said space temperature of said space is no longer increased by a further delivery of air.

* * * * *